(12) United States Patent
Croutcher

(10) Patent No.: US 9,073,577 B2
(45) Date of Patent: Jul. 7, 2015

(54) PLATES ALLOWING ADJUSTMENT OF CASTER AND CAMBER

(71) Applicant: Brian Croutcher, San Luis Obispo, CA (US)

(72) Inventor: Brian Croutcher, San Luis Obispo, CA (US)

( * ) Notice: Subject to any disclaimer, the term of this patent is extended or adjusted under 35 U.S.C. 154(b) by 0 days.

(21) Appl. No.: 14/474,235

(22) Filed: Sep. 1, 2014

(65) Prior Publication Data

US 2015/0091268 A1   Apr. 2, 2015

Related U.S. Application Data

(63) Continuation-in-part of application No. 14/043,743, filed on Oct. 1, 2013, now Pat. No. 8,820,759.

(51) Int. Cl.
*B62D 17/00* (2006.01)
*B60G 13/00* (2006.01)

(52) U.S. Cl.
CPC .............. *B62D 17/00* (2013.01); *B60G 13/003* (2013.01); *B60G 2200/464* (2013.01); *B60G 2200/46* (2013.01)

(58) Field of Classification Search
CPC .................. B60G 2200/4622; B60G 2200/46; B60G 220/464; B60G 2204/128; B60G 15/068; B62D 17/00

USPC .......... 280/86.751, 86.752, 124.147, 124.155
See application file for complete search history.

(56) References Cited

U.S. PATENT DOCUMENTS

| | | | | |
|---|---|---|---|---|
| 4,372,575 | A * | 2/1983 | Hyma | 280/86.752 |
| 4,684,150 | A * | 8/1987 | Specktor et al. | 280/86.753 |
| 5,098,117 | A * | 3/1992 | Specktor et al. | 280/86.753 |
| 5,484,161 | A * | 1/1996 | McIntyre | 280/124.155 |
| 6,328,321 | B1 * | 12/2001 | Nolan | 280/86.754 |
| 6,485,223 | B1 * | 11/2002 | Van Schmus et al. | 403/408.1 |
| 7,144,021 | B2 * | 12/2006 | Carlson | 280/86.752 |
| 8,317,210 | B1 * | 11/2012 | Ryshavy et al. | 280/124.147 |
| 8,820,759 | B1 * | 9/2014 | Croutcher | 280/86.752 |
| 2008/0303196 | A1 * | 12/2008 | Lyew et al. | 267/33 |
| 2008/0303233 | A1 * | 12/2008 | Dugandzic et al. | 280/86.751 |

* cited by examiner

*Primary Examiner* — James English
(74) *Attorney, Agent, or Firm* — James M. Duncan, Esq.; Klein DeNatale Goldner

(57) ABSTRACT

An apparatus allows for the independent adjustment of caster and camber for vehicles utilizing MacPherson strut front suspensions. The apparatus has, in stacked arrangement, a fastener plate, a lower plate, and an upper plate. Camber adjustments are generally made by manipulation of the lower plate and caster adjustments are generally made by manipulation of the upper plate. The upper plate may be mounted in two different positions to allow for different camber adjustments, such as for competitive situations and non-competitive situations. The device utilizes a thrust bearing having a race in the upper face of the spring perch and an opposing race which mounts around the base of the bearing cup.

20 Claims, 6 Drawing Sheets

PLATES ALLOWING ADJUSTMENT OF CASTER AND CAMBER

CROSS-REFERENCE TO RELATED APPLICATIONS

This is a continuation-in-part application of U.S. patent application Ser. No. 14/043,743 which was filed on Oct. 1, 2013.

BACKGROUND OF THE INVENTION

The present invention relates generally to automobile suspension systems and more particularly to devices which provide for the independent adjustment of camber and caster. Some automobiles, such as Ford Mustangs dating from 2005 to the present, hereinafter collectively referred to as "2005+ Mustangs", are equipped from the factory with MacPherson strut front suspensions. The camber and caster angles for the MacPherson strut suspensions found in the 2005+ Mustangs are fixed at the factory to a set position which reduces maintenance. The MacPherson strut configuration utilized in the 2005+ Mustangs have a strut rod at the top of the strut which mounts to a plate or other attachment assembly within a strut tower of the chassis as known in the art. The OEM upper strut mounting assemblies on these vehicles typically do not allow for camber or caster adjustments, although some vehicles may have mechanisms which allow for camber adjustment, such as slots in the strut tower which allow some camber adjustment.

However, while the fixed camber and caster settings may provide performance which is generally satisfactory for every day commuting purposes, the fixed settings do not provide the performance sought by automotive enthusiasts who desire to use their vehicles in competitive events such as road rallies, road racing, drag racing, etc. These users prefer to have precise control of the handling of their vehicles for the particular application. For example, in road racing, negative camber, where the bottom of the wheel is further out than the top of the wheel, is desirable because it improves tire grip when cornering. However, in drag racing, where maximum straight-line acceleration is desired, the greatest traction is obtained where the wheel has no camber angle and the tire tread is flat on the road.

Moreover, competitive owners frequently lower their vehicles to improve performance, which puts the camber out of the factory specification, which can increase wear on the tires and have a negative impact on handling.

It is also desirable to be to adjust the caster angle, which is the angular displacement between a vertical axis and the pivot line (an imaginary line running through the center of the upper ball joint to the center of the lower ball joint. Improper caster settings make it more difficult to maintain a straight line and can make steering heavier and less responsive. Caster adjustments may correct steering problems, such as causing the vehicle to pull toward the side with less positive caster. Positive caster improves the vehicle's straight line stability, which is a desired quality for drag racing.

Thus, it is desirable to have an apparatus which may be installed to replace the original manufacturer's parts, where the apparatus allows the adjustment of camber and caster in vehicles, such as 2005 and later Ford Mustangs, and other vehicles which have factory pre-set and non-adjustable caster and camber settings

SUMMARY OF THE INVENTION

Embodiments of the method and apparatus disclosed herein provide a solution to the problem described above. For purposes of this disclosure and the claims herein, the terms "front" and "back" (or "forward" and "rearward") respectively indicate directions which are toward the front and back of the vehicle. Likewise, the terms "up" and "down" (or "upward" and "downward") respectively indicate directions which are toward the ground and toward the top of the vehicle.

Embodiments of the apparatus for adjusting caster and camber may be generally summarized according the following description. The apparatus has, in stacked arrangement, a fastener plate, a lower plate, and an upper plate. Camber adjustments are generally made by manipulation of the lower plate and caster adjustments are generally made by manipulation of the upper plate.

At least one fastener plate is utilized to secure the position of a coil spring-strut assembly of a MacPherson-syle front suspension assembly. The different plates of the device are used to adjust camber and caster. The fastener plate (or fastener plates) may have a plurality of upwardly facing threaded fastening members, typically threaded studs attached or inserted through the fastener plate, where the fastening members extend upwardly from an upwardly facing of the fastener plate. These fastening members attach to a portion of the vehicle chassis known as the strut tower. Typically, the fastening members extend through openings at the top of the strut tower, where nuts are made up onto the threads of upwardly extending fastening members. If a single fastener plate is utilized, the interior of the fastener plate has a cutout portion defined by an interior wall. If more than one fastener plate is used, the positions of the installed multiple fastener plates define a cutout portion.

Alternatively, the fastener plate may have a plurality of threaded apertures adapted to receive threaded fasteners inserted through openings at the top of the strut tower, with the threaded ends of the fasteners received by the threaded apertures of the fastener plate.

Disposed in general overlaying relation to the fastener plate is the lower plate. The lower plate has a downwardly facing bottom side positioned adjacent to the upwardly facing face of the fastener plate. The threaded fastening members extend through openings in the lower plate. The lower plate has a bearing cup, referred to herein as the shaft housing, which substantially depends from the downwardly bottom side, but may also have a portion extending above the upwardly top side of the lower plate. The shaft housing is typically a cylindrical structure with an opening extending throughout its length. The shaft housing extends through the interior cut-out portion of the fastener plate. The bore of the shaft housing is for receiving an end of a strut shaft therethrough, along with bearing or bushing components which mount within the shaft housing and allow rotation of the shaft housing. The lower plate is releasably adjustable with respect to the fastener plate along a first axis, hereinafter referred to as the "X" axis, and along a second axis, hereinafter referred to as the "Y" axis. The X axis and the Y axis are substantially non-parallel and may be perpendicular to one another.

Disposed in general overlaying relation to the lower plate is the upper plate. The upper plate has a downwardly facing bottom side positioned adjacent to a top face of the lower adjustment plate. The upper plate has openings which sufficiently align with the openings in the lower plate to allow the threaded fastening members to extend through the openings in the upper plate. The interior of the upper plate may have a cutout portion defined by an interior wall, which allows for any portion of the shaft housing which extends above the top side of the lower plate to move within the cutout portion. The upper adjustment plate and the lower adjustment plate are jointly configured for allowing relative movement between the two plates along the X axis but restricting movement along the Y axis.

The lower plate has a plurality of upwardly facing protruding members which extend upwardly from the top face of the lower plate which are each received within a corresponding elliptical aperture in the upper plate. The engagement of the protruding members with the corresponding elliptical apertures allows relative movement between the upper plate and the lower plate along the X axis while inhibiting relative movement between the upper plate and the lower plate along the Y axis. A thrust bearing assembly couples to the lower plate. The thrust bearing assembly may have an upper member having an upper race, a spring perch comprising a lower race, and plurality of ball bearings disposed between the upper race and the lower race. The upper member and the spring perch have openings for receiving the shaft housing which couple the spring perch, and therefore the thrust bearing assembly to the lower plate. The spring perch provides a seat for the upper end of the coil spring which is a component of a MacPherson strut suspension.

DETAILED DESCRIPTION OF THE EMBODIMENTS

Figure 1:
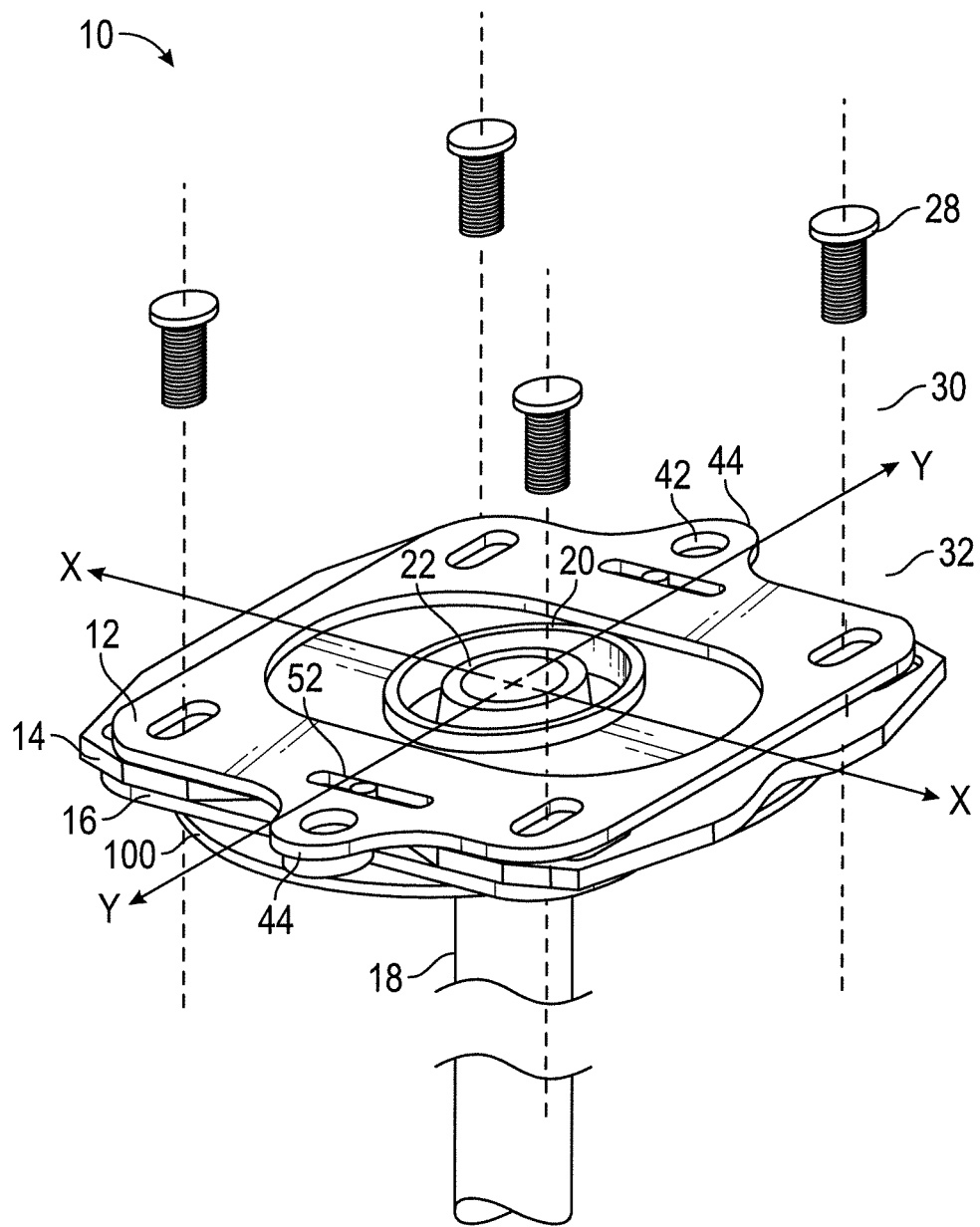
FIG. 1 shows an embodiment of the apparatus mounted on a strut shaft.
Figure 2:
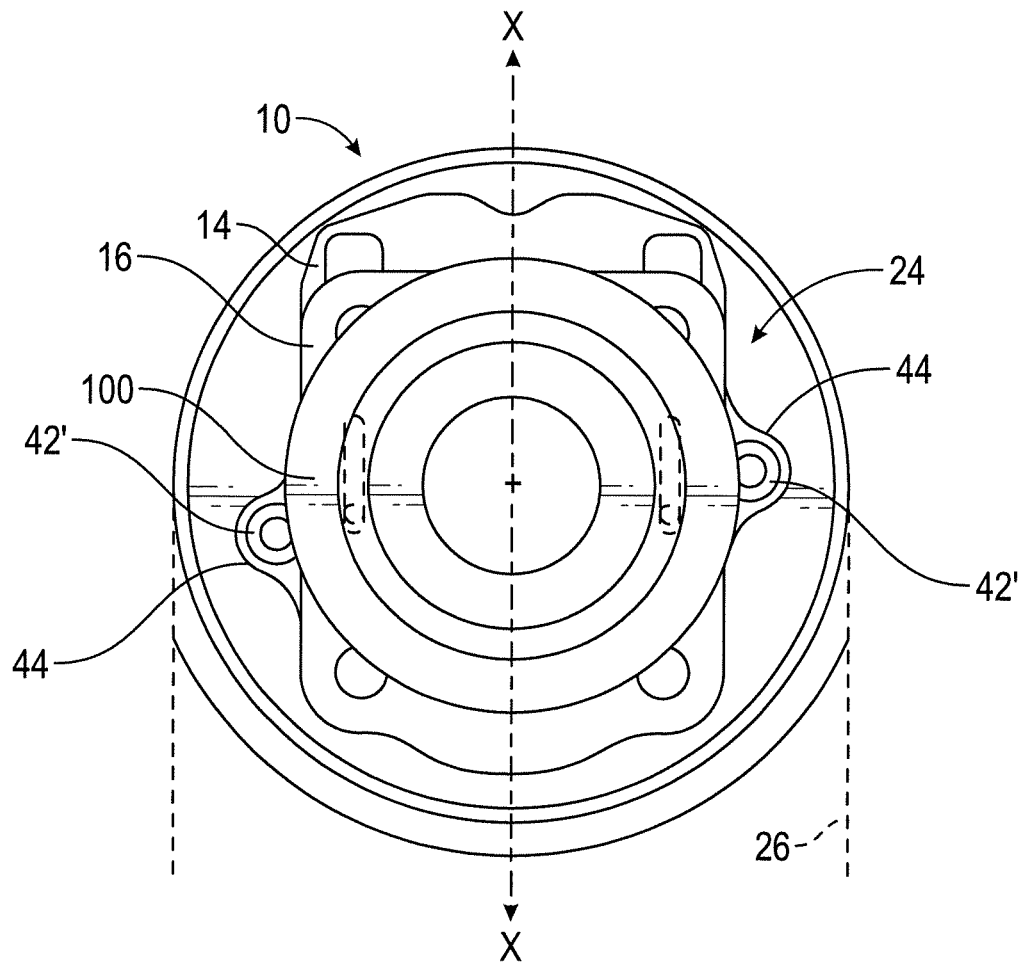
FIG. 2 shows an embodiment of the apparatus for adjusting caster and camber, viewed from the bottom, as mounted within a strut tower.
Figure 3:
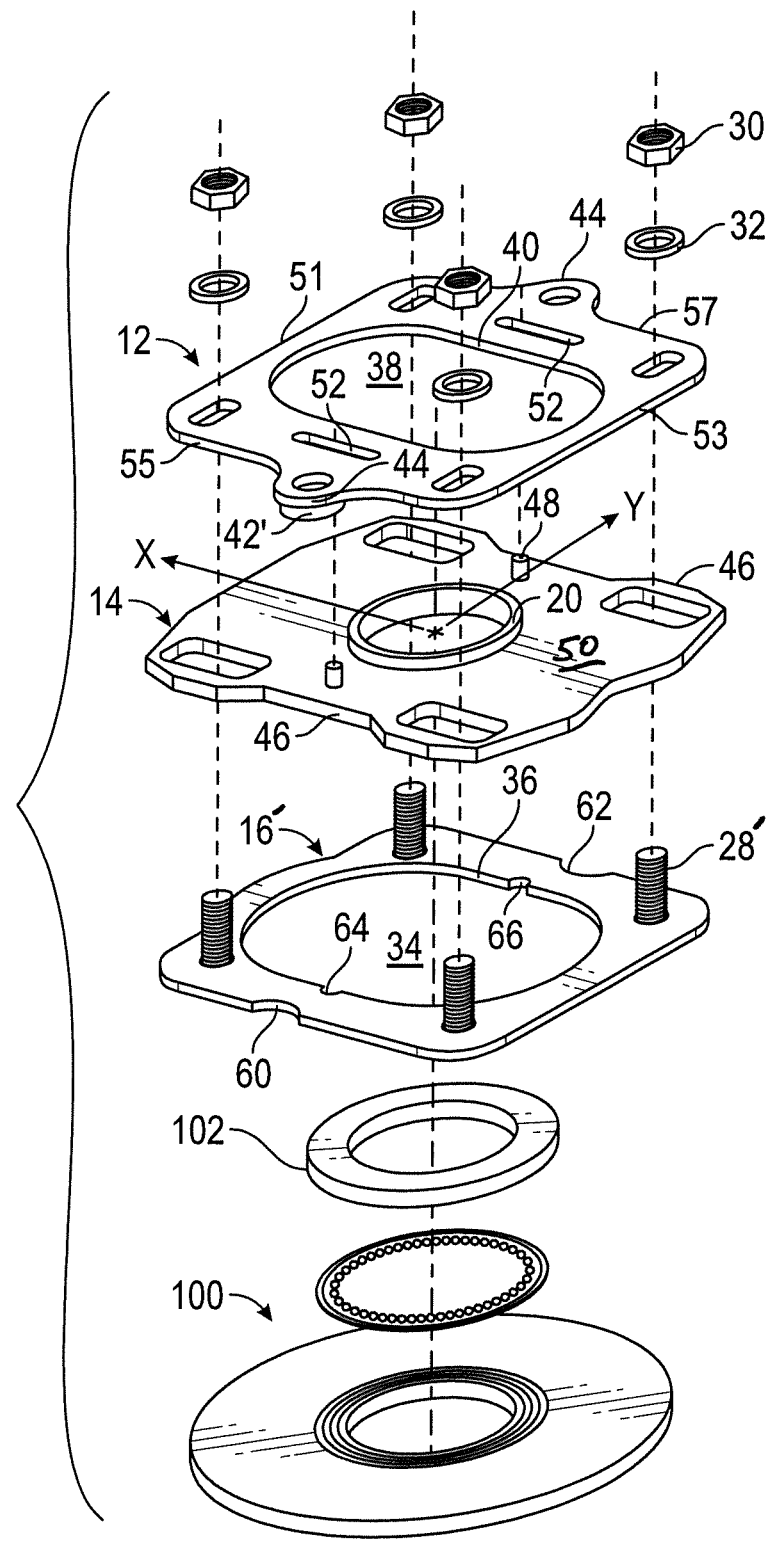
FIG. 3 shows an exploded view of an embodiment of the apparatus.

Referring specifically to the figures, FIG. 1 shows a perspective view of an embodiment of the disclosed camber/caster adjustment plate apparatus 10 (hereinafter, "apparatus"). As shown in FIG. 1, the apparatus is in a stacked configuration having an upper plate 12, a lower plate 14, and a fastener plate 16. A strut shaft 18 from a MacPherson strut (not shown) extends through a shaft housing 20 and is retained within bearing assembly 22. As shown in FIG. 2, the adjustment plate apparatus 10 is fastened to an upper surface 24 of strut tower 26. Referring to FIGS. 1 and 2, once caster and camber are adjusted as desired, the adjustment plate apparatus is fastened to the upper surface 24 by fastening members 28 which extend through the upper surface 24 of strut tower 26 into threaded apertures 67 within fastener plate 16. Alternatively, as shown in FIG. 3, fasteners 28' may be integral to fastener plate 16' and may extend upwardly and may be secured to the upper surface of strut tower 26 by nuts 30 and washers 32. In either case, the adjustment plate apparatus is also secured by either inserting a bolt (not shown) into either one of the threaded apertures 42 or nuts 42', which may be pressed-in and/or depend from lower face 50 or by placing a nut on fastener 42". The upper plate may comprise a forward side 51, a rearward side 53, a left side 55 and a right side 57.

Fastening members 28, 28' extend through elliptical apertures 29 in lower plate 14 where the elliptical apertures have a long axis generally parallel to the X axis. The positioning of fastening members 28 along the X axis within the elliptical apertures 29 in the lower plate 14 generally allows for making camber adjustments. It is to be noted that elliptical apertures 29 are wide enough to allow some motion of the stacked adjustment plates in the direction of the Y axis for adjusting caster Fastening members 28, 28' extend through elliptical apertures 31 in upper plate 12 (or 12'), which have a long axis generally parallel to the Y axis. The positioning of fastening members 28 along the Y axis within the elliptical apertures 31 in the upper plate generally allow for making caster adjustments.

Figure 4:
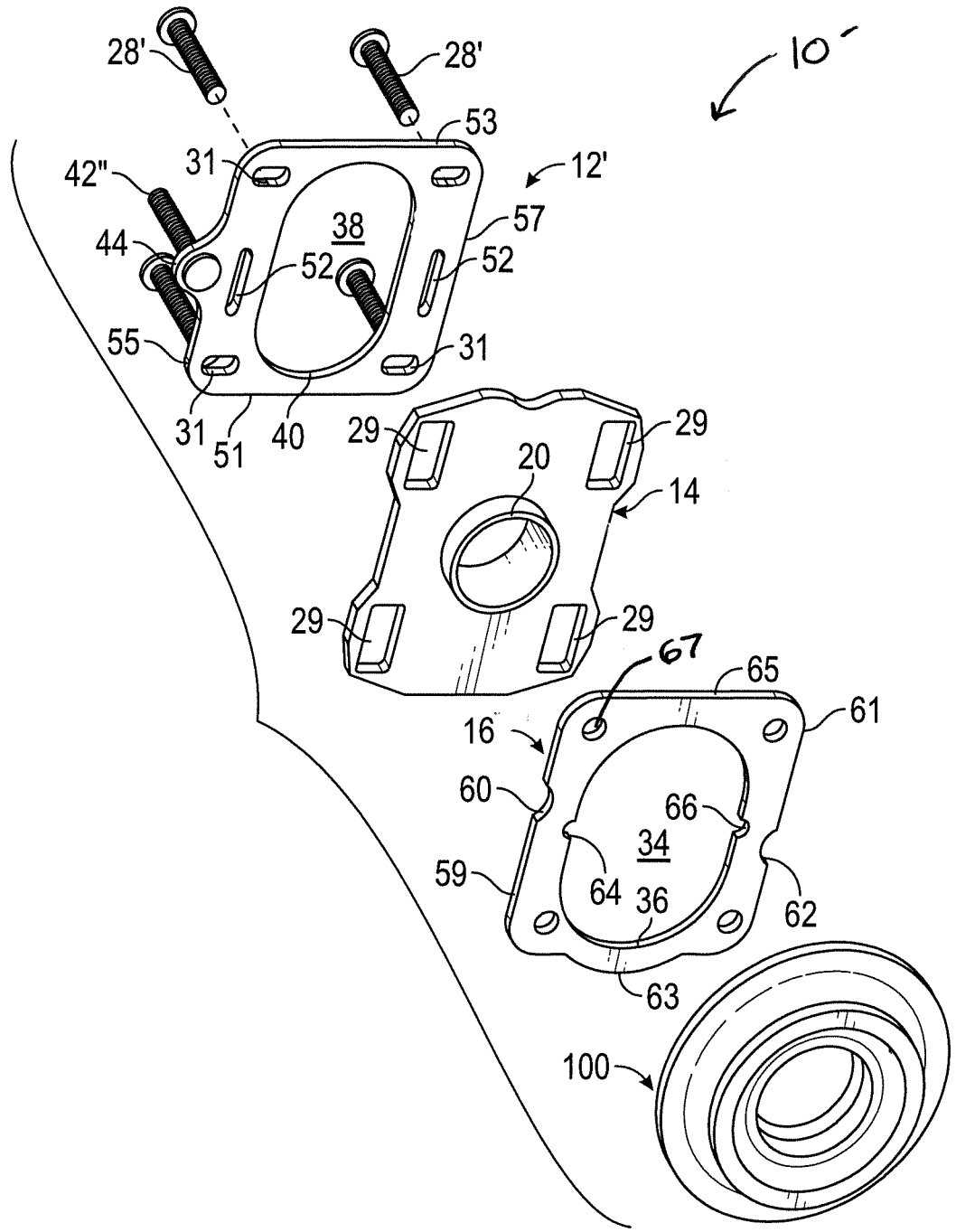
FIG. 4 shows an exploded view of an alternative embodiment of the apparatus, with the thrust bearing in an assembled configuration.
Figure 5:
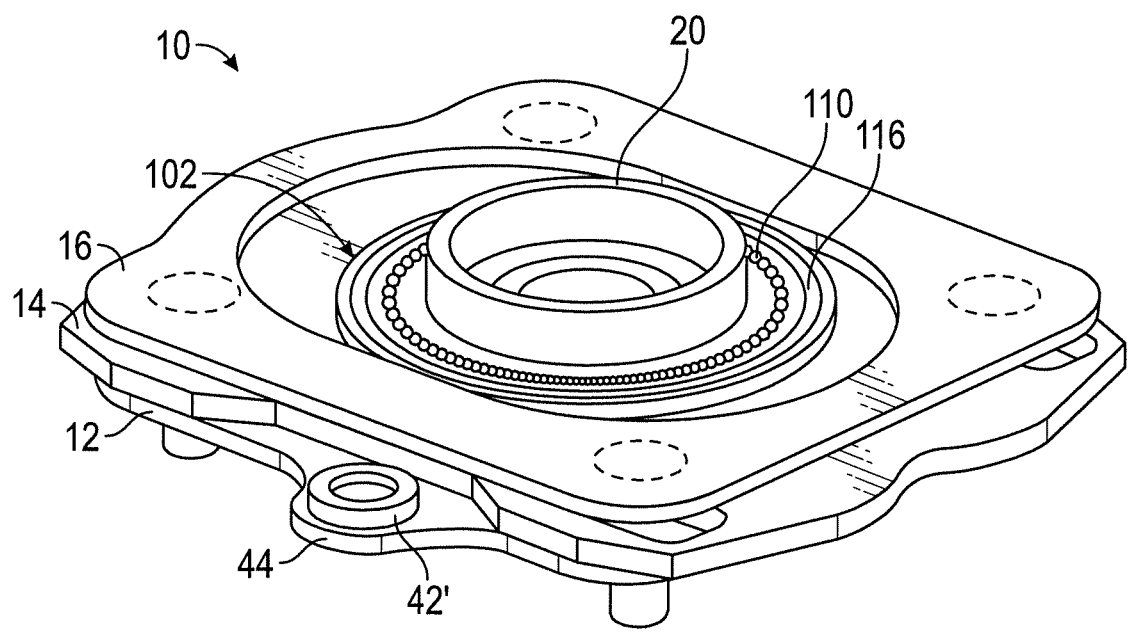
FIG. 5 shows a bottom view of an embodiment of the apparatus showing detail of a portion of the thrust bearing.
Figure 6:
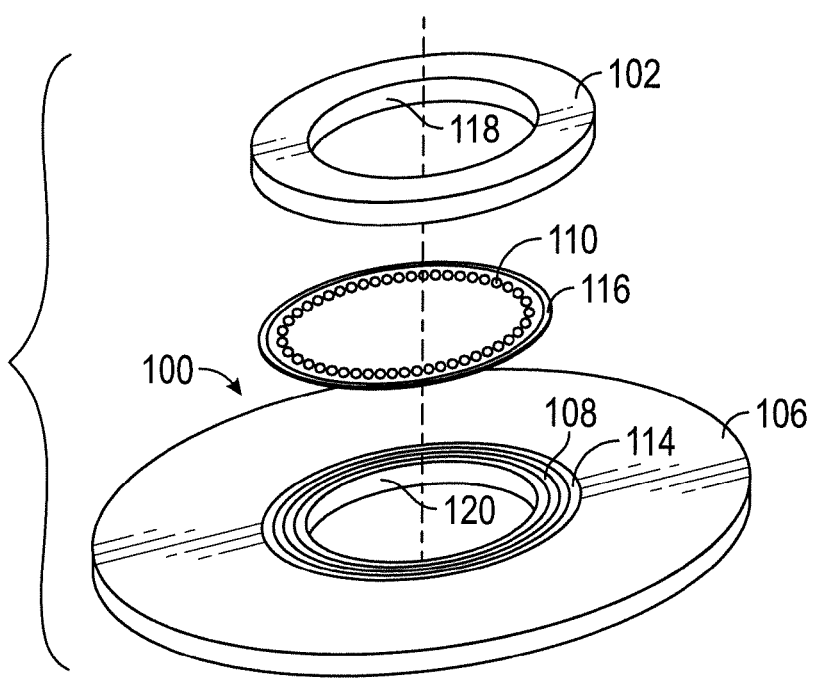
FIG. 6 shows the components of an embodiment of the thrust bearing assembly.
Figure 6A:
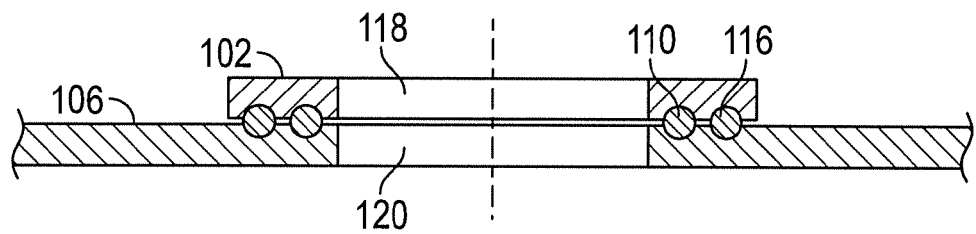
FIG. 6A shows a sectioned view of the thrust bearing assembly of FIG. 6.
Figure 6B:
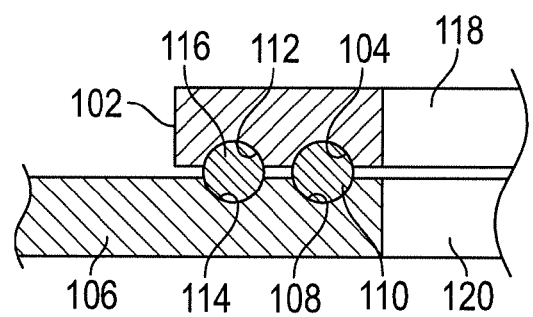
FIG. 6B shows a detailed view of the sectioned view of FIG. 6A.

Fastening members 28, 28' are attached through, attached to, or integral to fastener plate 16. As shown best in FIGS. 3-4, fastener plate 16 has an interior cut-out portion 34, which is bounded by an interior peripheral wall 36. Similarly, upper plate 12 has an interior cut-out portion 38 which is bounded by an interior peripheral wall 40. Interior cut-out portions 34 and 38 are generally elliptical in shape and allow movement of the plates and the shaft housing 20 prior to the tightening of nuts 30 on fastening members 28.

In addition to being fastened to the upper surface 24 by fastening members 28, 28', for the purpose discussed below, upper plate 12 comprises either a threaded aperture 42, a pressed-in nut 42', or an integral fastener 42", any of which are disposed within an extending tab 44 which extends outside of the sides 46 of lower plate 14. Any one of the threaded aperture 42, the pressed-in nut 42' or the integral fastener 42" of extending tab 44 are utilized to secure upper plate 12 to the upper surface 24 of strut tower 26. This feature allows the upper plate 12, which is manipulated to adjust caster, to be secured, while still allowing manipulation of lower plate 14 in the direction of the X axis so that camber adjustment, which is made by manipulation of the lower plate 14 along the X axis, may be accomplished independent of the caster setting.

Upper plate 12 may comprise a single extending tab 44, or may have an extending tab 44 on either side of the upper plate. The extending tabs may be either on the left side 55 or the right side 57, or on both sides of upper plate 12. As shown best in FIG. 2, the tabs 44 may be offset from one another, such that, with reference to the X axis, one tab is at a different position than the second. This offset may be utilized to provide different camber settings according to which setting is utilized. For example, the offset may be utilized to generally set a first camber setting utilized for competition purposes and a second camber setting utilized for non-competition purposes. The desired camber setting can then be realized by rotating the upper plate 12 by 180 degrees to select the desired tab and aligning the selected tab with an aperture in the upper surface 24 of the strut tower 26 and either making up a bolt into the threaded aperture 42, pressed-in nut 42', or placing a nut on integral fastener 42'.

In order for camber and caster to be set independently from one another, it is necessary that lower plate 14 may be moved relative to upper plate 12 along the X axis after the camber adjustment has been fixed by securing upper plate 12 to the upper surface 24 of the strut tower 26 as described above. However, once upper plate 12 has been secured to the upper surface 24 of the strut tower 26, further movement of lower plate 14 along the Y axis is inhibited by an interlocking structure between the two plates. This interlocking structure generally comprises the engagement of a plurality of protruding members 48 which extend upwardly from the top face 50 of the lower plate 14, where each protruding member is received within an elliptical aperture 52 in upper plate 12, 12', where each elliptical aperture corresponds to each of the protruding members 48. The protruding members 48 have a diameter which is sufficiently small to fit within elliptical apertures 52, but which is large enough to inhibit or restrict any appreciable motion along the Y axis. However, elliptical apertures 52 are sufficiently long to allow for approximately one inch of motion along the X axis. Protruding members 48 may be pins attached to top face 50, or may be installed through apertures in lower plate 14, or lower plate 14 may be machined such that the protruding members are machined from the fabrication material and the protruding members are integral posts machined into lower plate 14.

Fastener plate 16 may be generally, but not necessarily, rectangular, having a left side 59, a right side 61, a forward side 63, and a rearward side 65. Either the left side 59 and/or the right side 61 may have a cut-out portion 60, 62. The cut-out portions 60, 62 are adapted to receive an edge of pressed-in nuts 42. Likewise, the interior peripheral wall 36 which defines interior cut-out portion 34 of fastener plate 16 may have semi-circular apertures 64, 66. The engagement of the edges of the pressed-in nuts 42 into cut-out portions 60, 62 serve to lock upper plate 12 to lower plate 16.

Embodiment of the device may comprise a thrust bearing assembly 100 which comprising an upper member 102 having an upper race 104, a spring perch 106 comprising a lower race 108, and plurality of ball bearings 110 disposed between the upper race and the lower race. Upper member 102 and spring perch 106 may each have an hemi-spherical or elliptical groove 112, 114 in the opposing faces of each which may be utilized for disposing O-ring 116. The upper member 102 and spring perch 106 each have axially-aligned openings 118, 120 [s] for receiving the shaft housing thereby coupling the spring perch to the lower plate.

With the various nuts and fasteners holding the apparatus in place in a loosened state, the lower plate 14 and the upper plate 12 may be positioned along the X axis and the Y axis. Caster may be adjusted by manipulating the coil spring-strut assembly and then locking the upper plate 12 into position by attaching the upper plate to the upper surface 24 of strut tower 26 by insertion and tightening of a fastener into threaded aperture 42 or pressed-in nut 42' or tightening a nut on integral stud 42".

Once caster is set, the coil spring-strut assembly may be manipulated to adjust camber, and nuts 30 tightened on threaded fasteners 28, or threaded fasteners 28' made up to lock the camber adjustment into position. As discussed above, a preliminary camber setting may be realized by selecting whether to attach a fastener to either the left side 55 or right side 57 of upper plate 12, because the attachment points (e.g., threaded aperture 42) on the left side and the right side may be offset with respect to the X axis. For example, the threaded aperture on the left side 55 may have a center which is half-an inch forward of the center of the threaded aperture on the right side 57.

While the above is a description of various embodiments of the present invention, further modifications may be employed without departing from the spirit and scope of the present invention. Thus the scope of the invention should not be limited according to these factors, but according to the following appended claims.

What is claimed is:

1. An apparatus for adjusting caster and camber, the apparatus comprising:

a fastener plate comprising a first face and a plurality of apertures for receiving threaded fastening members for attachment of the apparatus to a vehicle strut tower;

a lower plate having a lower face thereof positioned adjacent the first face of the fastener plate with the threaded fastening members extending through the lower plate, the lower plate comprising a shaft housing depending from the lower face, the shaft housing having a bore configured for receiving an end of a strut shaft therethrough, wherein the lower plate is releasably adjustable with respect to the fastener plate along a first axis and a second axis, wherein the second axis is substantially non-parallel to the first axis;

an upper plate having a downward face positioned adjacent to a top face of the lower plate wherein said threaded fastening members extend through the upper plate, wherein the upper plate and the lower plate are jointly configured for allowing the upper plate to be releasably adjustable with respect to the fastener plate along the second axis;

wherein the lower plate comprises an upward face comprising a plurality of upwardly extending protruding members;

wherein the upper plate comprises a plurality of elliptical apertures, an elliptical aperture of the plurality of elliptical apertures corresponding to and receiving one of each of said plurality of upwardly extending protruding members, wherein the receiving of one of each of said plurality of the upwardly extending protruding members with the corresponding elliptical apertures of the plurality of elliptical apertures allows relative movement between the upper plate and the lower plate along the first axis while inhibiting relative movement between the upper plate and the lower plate along the second axis.

2. The apparatus of claim 1 further comprising a thrust bearing assembly comprising an upper member having an upper race, a spring perch comprising a lower race, and plurality of ball bearings disposed between the upper race and the lower race, wherein the upper member and spring perch comprise openings for receiving the shaft housing thereby coupling the spring perch to the lower plate.

3. The apparatus of claim 1 wherein the upwardly extending protruding members comprise pins attached to the upward face of the lower plate.

4. The apparatus of claim 1 wherein the upwardly extending protruding members comprise integral posts.

5. The apparatus of claim 1 wherein the upper plate comprises four sides.

6. The apparatus of claim 5 wherein the four sides comprise a forward side, a rearward side, a left side, and a right side.

7. The apparatus of claim 6 wherein either the left side or the right side comprise an outwardly extending tab integral to the upper plate, the tab comprising an aperture extending through the tab member.

8. The apparatus of claim 6 wherein both the left side and the right side each comprise an outwardly extending tab integral to the top plate, each tab comprising an aperture extending therethrough.

9. The apparatus of claim 7 wherein the aperture comprises a threaded nut disposed within the aperture.

10. The apparatus of claim 8 wherein each aperture comprises a threaded nut disposed within each aperture.

11. The apparatus of claim 7 wherein the aperture comprises threads.

12. The apparatus of claim 10 wherein the fastener plate comprises a left side and a right side and the left side and the right side each comprise a cutout portion adapted to receive an edge of each of the threaded nuts.

13. The apparatus of claim 8 wherein the extending tab of the left side and the extending tab of the right side are offset from one another.

14. An apparatus for adjusting caster and camber, the apparatus comprising:
- a fastener plate comprising a top face, the fastener plate comprising an interior cut-out portion defined by an interior peripheral wall of the fastener plate;
    - a lower plate having a top side and a lower face thereof positioned adjacent the top face of the fastener plate, the lower plate comprising a plurality of elongated apertures, each elongated aperture adaptable for receiving a fastening member, the lower plate comprising a first side and a second side, the lower plate comprising a shaft housing depending from the lower face and extending through the interior cut-out portion of the fastener plate, the shaft housing having a bore configured for receiving an end of a strut shaft therethrough, wherein the lower plate is releasably adjustable with respect to the fastener plate along a first axis and a second axis, wherein the second axis is substantially perpendicular to the first axis and the plurality of elongated apertures are substantially parallel with the first axis;
    - an upper plate having a forward side, a rearward side, a left side and a right side, the upper plate further comprising a lower face positioned adjacent to the top side of the lower plate such that the upper plate and the lower plate are jointly configured for allowing the upper plate to be moveable with respect to the fastener plate along the second axis;
    - wherein the top side of the lower plate further comprises a pair of upwardly extending members;
    - wherein the upper plate comprises a pair of elliptical apertures, an elliptical aperture corresponding to and receiving one of each upwardly extending members, wherein the engagement of each protruding member with the corresponding elliptical aperture allows relative movement between the upper plate and the lower plate along the first axis while inhibiting relative movement between the upper plate and the lower plate along the second axis; and
    - a plurality of fasteners which extend between the fastener plate, the lower plate and the upper plate for attachment of the apparatus to a vehicle strut tower.

15. The apparatus of claim 14 wherein the upper plate comprises an outwardly extending integral tab having an aperture extending therethrough, said aperture respectively extending outward of either the first side or the second side of the lower plate.

16. The apparatus of claim 15 wherein the aperture in the outwardly extending tab comprises a threaded nut disposed within the aperture.

17. The apparatus of claim 14 wherein the left side of the upper plate comprises an outwardly extending tab having an aperture therethrough, said aperture extending outward of the first side of the lower plate and the right side of the upper plate comprises an outwardly extending tab having an aperture therethrough, said aperture extending outward of the second side of the lower plate.

18. The apparatus of claim 17 wherein a first nut is disposed within the aperture of the outwardly extending tab on the left side and a second nut is disposed withi the aperture of the outwardly extending tab on the right side.

19. The apparatus of claim 18 wherein the fastener plate comprises a left side and a right side and the left side comprises first cutout portion for receiving an edge of the first nut and the right side comprises a second a cutout portion for receiving an edge of the second nut.

20. The apparatus of claim 17 wherein the extending tab of the left side and the extending tab of the right side are offset from one another.

* * * * *